(12) United States Patent
Neumann et al.

(10) Patent No.: US 10,879,537 B2
(45) Date of Patent: Dec. 29, 2020

(54) LITHIUM ION CELL FOR A SECONDARY BATTERY

(71) Applicant: Heraeus Quarzglas GmbH & Co. KG, Hanau (DE)

(72) Inventors: Christian Neumann, Hungen (DE); Jörg Becker, Niddatal (DE); Sascha Pihan, Aschaffenburg (DE); Matthias Otter, Münster (DE)

(73) Assignee: HERAEUS QUARZGLAS GMBH & CO. KG, Hanau (DE)

( * ) Notice: Subject to any disclaimer, the term of this patent is extended or adjusted under 35 U.S.C. 154(b) by 644 days.

(21) Appl. No.: 14/897,918

(22) PCT Filed: Jun. 10, 2014

(86) PCT No.: PCT/EP2014/061982
§ 371 (c)(1),
(2) Date: Dec. 11, 2015

(87) PCT Pub. No.: WO2014/198696
PCT Pub. Date: Dec. 18, 2014

(65) Prior Publication Data
US 2016/0111726 A1    Apr. 21, 2016

(30) Foreign Application Priority Data
Jun. 12, 2013   (DE) .......................... 10 2013 106 114

(51) Int. Cl.
*H01M 4/62*      (2006.01)
*H01M 10/0525*   (2010.01)
(Continued)

(52) U.S. Cl.
CPC ......... *H01M 4/625* (2013.01); *H01M 4/0435* (2013.01); *H01M 4/131* (2013.01);
(Continued)

(58) Field of Classification Search
CPC .... H01M 4/625; H01M 4/0435; H01M 4/131; H01M 4/133; H01M 4/1391; H01M 4/364; H01M 10/0525; H01M 2004/021
See application file for complete search history.

(56) References Cited

U.S. PATENT DOCUMENTS 7,572,551 B1    8/2009  Panzer et al.
9,174,878 B2   11/2015  Neumann
(Continued)

FOREIGN PATENT DOCUMENTS

CN    102340027 A    2/2012
DE   102010005954 A1    7/2011
(Continued)

OTHER PUBLICATIONS

Office Action dated Oct. 18, 2017 in CN Application No. 201480033518.3.
(Continued)

*Primary Examiner* — Michael L Dignan
(74) *Attorney, Agent, or Firm* — Panitch Schwarze Belisario & Nadel LLP

(57) ABSTRACT

Known lithium-ion cells for a secondary battery including an electrode have an active material layer containing active material particles in contact with a non-aqueous electrolyte and a particulate, porous additive. Using this as a basis, it is desired to achieve an improvement in the lithium-ion cells in respect of their gravimetric and volumetric energy density and in respect of inexpensive and reproducible production, and in particular to ensure that the desired properties of the active material layer are not changed, or are not changed to an unacceptable degree, by compression during calendering. Accordingly, it is proposed to use, as an additive, porous carbon particles having a porosity in the range between 50% and 95% and having macropores which are fluidically connected to one another and which are delimited by carbon (Continued)

walls having an average wall thickness in the range of 5 to 500 nm.

9 Claims, 3 Drawing Sheets

(51) Int. Cl.
    *H01M 4/1391*     (2010.01)
    *H01M 4/04*     (2006.01)
    *H01M 4/131*     (2010.01)
    *H01M 4/133*     (2010.01)
    *H01M 4/36*     (2006.01)
    *H01M 4/02*     (2006.01)

(52) U.S. Cl.
    CPC ......... *H01M 4/133* (2013.01); *H01M 4/1391* (2013.01); *H01M 4/364* (2013.01); *H01M 10/0525* (2013.01); *H01M 2004/021* (2013.01)

(56) References Cited

U.S. PATENT DOCUMENTS

| | | |
|---|---|---|
| 2004/0131934 A1 | 7/2004 | Sugnaux et al. |
| 2005/0169829 A1 | 8/2005 | Dai et al. |
| 2008/0038638 A1 | 2/2008 | Zhang et al. |
| 2008/0096110 A1 | 4/2008 | Bito et al. |
| 2010/0035141 A1 | 2/2010 | Grosvenor |
| 2012/0070717 A1 | 3/2012 | Harada et al. |
| 2012/0094173 A1 | 4/2012 | Moruiguchi et al. |
| 2012/0234695 A1* | 9/2012 | Mayes .............. C01B 32/20 205/758 |
| 2012/0301387 A1* | 11/2012 | Neumann ............ C03B 19/14 423/445 R |
| 2013/0104392 A1 | 5/2013 | Morikawa |
| 2013/0164635 A1 | 6/2013 | Schmidt et al. |
| 2013/0189575 A1* | 7/2013 | Anguchamy ......... C01B 33/023 429/211 |
| 2013/0273433 A1* | 10/2013 | Jouanneau-Si Larbi .................... H01M 4/38 429/231.8 |
| 2015/0191357 A1 | 7/2015 | Yang et al. |

FOREIGN PATENT DOCUMENTS

| | | |
|---|---|---|
| JP | H07130396 A | 5/1995 |
| JP | 2005262324 A | 9/2005 |
| JP | 2010225487 A | 10/2010 |
| JP | 2012028215 A | 2/2012 |
| JP | 2012243463 A | 12/2012 |
| JP | 2013518022 A | 5/2013 |
| JP | 2013527579 A | 6/2013 |
| WO | 2010150859 A1 | 12/2010 |
| WO | 2012008524 A1 | 1/2012 |
| WO | 2013009457 A2 | 1/2013 |
| WO | 2013054481 A1 | 4/2013 |
| WO | 2014015709 A1 | 1/2014 |

OTHER PUBLICATIONS

Ramadesigan et al., "Optimal Porosity Distribution for Minimized Ohmic Drop across a Porous Electrode," Journal of The Electrochemical Society, vol. 157, No. 12, pp. A1328-A1334 (2010).
Srinivasan et al., "Design and Optimization of a Natural Graphite/Iron Phosphate Lithium-Ion Cell," Journal of The Electrochemical Society, vol. 151, No. 10, pp. A1530-A1538 (2004).
International Preliminary Report on Patentability dated Dec. 23, 2015 in International Application No. PCT/EP2014/061982.
International Search Report dated Aug. 21, 2014 in International Application No. PCT/EP2014/061982.
Jache et al., "Towards commercial products by nanocasting: characterization and lithium insertion properties of carbons with a macroporous, interconnected pore structure," Journal of Materials Chemistry, vol. 22, pp. 10787-10794 (2012).
Hu et al., "Synthesis of Hierarchically Porous Carbon Monoliths with Highly Ordered Microstructure and Their Application in Rechargeable Lithium Batteries with High-Rate Capability," Advanced Functional Materials, vol. 17, pp. 1873-1878 (2007).
Office Action dated Apr. 17, 2014 in DE Application No. 102013106114.1.
Office Action dated May 7, 2018 in JP Application No. 2016518966.

* cited by examiner

LITHIUM ION CELL FOR A SECONDARY BATTERY

CROSS-REFERENCE TO RELATED APPLICATIONS

This application is a Section 371 of International Application No. PCT/EP2014/061982, filed Jun. 10, 2014, which was published in the German language on Dec. 18, 2014, under International Publication No. WO 2014/198696 A1 and the disclosure of which is incorporated herein by reference.

BACKGROUND OF THE INVENTION

The present invention refers to a lithium ion cell for a secondary battery with an electrode, comprising an active material layer containing active material particles and a particulate porous additive in contact with a non-aqueous electrolyte.

In the development of mobile energy storage devices the demand for rechargeable batteries ("accumulators" or "secondary batteries") is increasing. The basic requirement is here a gravimetric and volumetric energy density that is as high as possible. Moreover, the electrode materials should be inexpensive, non-toxic, non-explosive, and easily processible—especially for commercial applications.

Like primary batteries, secondary batteries consist of one or more cells in which a respective cathode (positive electrode) is spatially and electrically separated from an anode (negative electrode) by means of a separator. The conversion of the stored chemical energy into electrical energy is based on electrochemical redox reaction and the accompanying transport of ions between the electrodes. The separator must be permeable to these ions.

Lithium secondary batteries are increasingly used. In these batteries the anode consists, for instance, of a porous carbon skeleton suited for the reversible insertion and removal (intercalation and deintercalation) of lithium ions. The cathode normally consists of metal oxides that are also suited for the incorporation of Li+ ions in the discharging process. Both the anode and the cathode contain a metallic electrical connector each working as a current collector in contact with a layer with the active material. This layer is here also called "active material layer."

Microporous membranes of plastics (polyethylene (PE) or polypropylene (PP)) or of ceramics are often used as a separator material.

The electrolyte serves as an ion transport medium both in the separator and within the electrodes themselves. Since the standard potential of metallic lithium (−3.04 V) is smaller than that of hydrogen (0 V), non-aqueous electrolytes must be used. Polymer electrolytes or aprotic electrolyte solutions, such as 1-molar $LiPF_6$ solution in a mixture of 1:1 ethylene carbonate: dimethyl carbonate, are common. As a rule, the conductivity of such electrolytes is, however, lower than that of an aqueous electrolyte, which results in a lower performance.

To mitigate this drawback and to keep the ion transport routes short and the internal resistance small, lithium ion cells are equipped with comparatively thin active material layers and separators. The total layer thickness of a cell is normally less than 300 µm. This, however, is accompanied by a lower energy density of the cell.

The volumetric and gravimetric energy density can be raised by increasing the amount of the active material. Therefore, the cavity volume that is not occupied by the active material particles only represents about 15-25% of the total volume. This comparatively low porosity, in turn, is accompanied by lower ion mobility.

For the manufacture of electrodes, powders or pastes of the respective electrode material are applied as a thin single layer to a metallic foil. The metal serves as an electrical connector of the respective electrode. Together with the metal foil the electrode material is supplied to heated calender rolls and pressed. In this "calendering process" the density of the active material layer is increased. This will optimize the volumetric energy density, but is also required for ensuring a locally constant electrode thickness and a high mechanical strength in a reproducible way. The electrode material layers are dried and subsequently either dimensioned individually and processed together with a separator into a cell, or the corresponding sheets are laminated as an anode-separator-cathode stack by the roll and only then cut to size or punched out. In a final step an electrolyte is added and sealing is carried out.

Many concepts have been suggested with the aim to increase porosity and to improve ion mobility and thus to shorten the charging time and to avoid any local heating-up.

Initially, the homogeneous layer thickness which is achievable with mass-suitable single coating methods has been regarded to be economically viable and its optimization has been aimed at for the respective application (Venkat Srinivasan, John Newman; "Design and Optimization of a Natural Graphite/Iron Phosphate Lithium-Ion Cell," *Journal of The Electrochemical Society*, 151(10): A1530-A1538 (2004)). It has only been recently that publications also deal with the generation of a geometrically inhomogeneous porosity by way of multiple coatings either by using differently strong calendering processes (Ramadesigan, Venkatasailanathan et al. "Optimal Porosity Distribution for Minimized Ohmic Drop Across a Porous Electrode," *Journal of The Electrochemical Society*, 157 (12): A1328-A1334 (2010)) or by way of thin-film technology in combination with 3D-structured calendering methods (International patent application Publication No. WO 2013/009457 A2).

U.S. Patent Application Publication 2004/0131934 A1 recommends that mesoporous agglomerations of active material particles, which are substantially or exclusively present as nanoparticles, should be produced in the active material layer. This is supposed to yield a three-dimensional framework structure with a large surface area and high electrochemical kinetics.

A similar suggestion is made in U.S. Patent Application Publication 2008/0038638. Here, an increased porosity is to be achieved by encapsulating the active material particles of the anode in a porous, electrically conductive matrix. Moreover, the porous matrix serves to compensate for the considerable volume increase during the intercalation of Li ions in the charging process.

For the same reason it is suggested in U.S. Patent Application Publication 2008/0096110 A1 that the active material of the anode that is particularly susceptible to volume changes should be embedded into the pores of a porous substrate of electrically conductive material. The substrate is, for example, a metallic foamed body of nickel, copper or titanium, or of carbon-impregnated cloth or paper, respectively.

The structures which are here provided in the active material layer are more or less filigree and withstand the calendering process either not at all or only with a restricted functionality. Calendering, however, cannot be dispensed with if one wants to observe the desired high volumetric energy density as well as predetermined minimal manufacturing tolerances in the electrode production.

Another configuration of an active material layer is described in U.S. Patent Application Publication 2010/0035141 A1, which also discloses a generic lithium-ion cell. Apart from active material particles and the electrolyte, the active material layer includes further components, inter alia specifically hollow spherical or elongated particles with a maximum dimension of less than 20 µm. These hollow particles are called "percolation additives." They consist of hollow microspheres or hollow fibers of glass, ceramics or plastics. Furthermore, the active material layer contains small carbon particles, so-called conductive carbon black, for improving the electrical conductivity.

The particles added as percolation additives loosen the dense packing of the active material particles even if these have a small particle size. Moreover, the cavities or voids of the particles may serve as a heat reservoir. Therefore, even in the case of a high proportion of active material, high ion mobility can be maintained and a good heat absorption can also be guaranteed by using such diffusion additives in the active material layer.

U.S. Patent Application Publication 2012/0094173 A1 describes an electrode material of macroporous graphite for a lithium-ion secondary battery. The micropore proportion of the total surface area is between 0 and 0.74. Moreover, the surface area ratio of two specific Raman absorption bands to each other is defined; this surface area ratio is to represent the degree of graphitization. The macroporous graphite is produced by way of a template method using a $SiO_2$ template. It is shaped by pressing $SiO_2$ particles that have been produced in a wet chemical process. The graphitization temperature is relatively low; it is between 900° C. and 1500° C. For the production of the negative electrode of a lithium-ion battery cell the macroporous graphite is pressed together with active material, a binder and conductive agent onto a copper foil.

The porous particles which are here added as percolation additive act like a "dilution" of the active material; they basically reduce the volumetric energy density. The particles are either so hard that they easily withstand the pressing force during calendering (such as hollow bodies of glass or of ceramics), or they are soft and plastically deformable (such as hollow spheres of plastics), the porosity of which is, however, decreasing during the pressing operation.

There is a constant demand for the improvement of lithium ion cells, specifically in terms of their gravimetric and volumetric energy density and with respect to an inexpensive and reproducible production. It must be ensured that the desired properties of the active material layer are not unacceptably changed by compression during calendering.

BRIEF SUMMARY OF THE INVENTION

This object is achieved according to the invention by a lithium ion cell in which, starting from the aforementioned cell, porous carbon particles are used as the additive, the porosity thereof being in the range between 50% and 95% and comprising fluidically interconnected macropores which are defined by carbon walls with a mean wall thickness in the range of 5 nm to 500 nm.

The carbon particles used according to the invention differ from the percolation additives of the prior art by their chemical composition, by the electrical conductivity and by the type of their porosity. The volume of the carbon particles is formed to a large extent or even predominantly by macropores which are fluidically interconnected. They have an open porosity, with pores and pore channels running therethrough in a network-like or three-dimensional manner, so that the pore space ends at countless places in an open form on the particle surface.

By comparison with micropores or mesopores, macropores show a lower degree of geometric effects impeding ion mobility. This includes so-called "tortuosity" and "constrictivity."

Tortuosity describes the winding degree of the transport routes. It is determined by the amount of macropores and also by the channel system through which the macropores are interconnected.

Similarly, a large amount of macropores also has an impact on local constrictivity, which describes the resistance of the pores to diffusion processes and depends on the ratio of the size of the diffusing particles and the pore diameter. The constrictivity is increased by a great proportion of macropores and thereby improves ion mobility.

Hence, a degree of macroporosity within the active material layer is required for the desired diffusion-improving effect. This is locally provided by the carbon particles distributed therein.

The electrolyte and the active-material ions dissolved therein can penetrate the active material through these particles locally in a relatively easy and fast manner. Simulation calculations show that the penetration of such carbon particles is faster—at least by a factor 10—than the penetration of other areas of the active material layer. This type of porosity of the carbon particles leads to an ion mobility that is higher on the whole within the active material layer, i.e., a faster charging and discharging process. Therefore, with the same electrochemical performance the active material layer can be given a greater thickness in the lithium ion cell according to the invention than is standard, for instance a thickness of 70 µm or more. This simplifies cell production and reduces the manufacturing costs.

The macropores that are here suited have a pore size starting from 0.05 µm. Pores smaller than 0.05 µm can hardly be avoided, but they show a higher degree of the above-explained wall effects and contribute little to the ion mobility. A small pore proportion with maximal pore dimensions of more than 5 µm is normally also difficult to avoid, but aggravates mechanical fitting into the active material layer.

A further essential property of the carbon particles is their mechanical behavior during calendering. The carbon particles consist of a filigree carbon skeleton with thin brittle walls that do not substantially exceed a mean wall thickness in the range of 500 nm and are preferably in the range of 10 nm to 100 nm. They give in slightly to local pressure and are impressed in this process or break up easily. Since the carbon particles are traversed by pore space, the impressed particles and separated fragments maintain their porosity. During calendering of the active material layer locally high forces are acting on the carbon structure due to contact with other particles, so that the structure is superficially impressed, broken up or sheared off accordingly. Deformed particles and fragments produced thereby fill remaining cavities between the other particles. Adjoining fragments of the carbon particles may partly recombine under pressure into porous filling mass. Due to "brittle deformation," i.e., without any significant plastic or elastic deformation, the carbon particles thereby adapt to the other particles of the active material layer and fill the existing vacant space. The active material layer is thereby optimally filled up with porous carbon mass; this is not achievable with any other known filler.

A special advantage of the brittle deformation is that the initial pore volume of the carbon particles decreases little. The accompanying basic functionalities with respect to accelerated penetration and electrical conductivity thus do not get lost.

The pressing of the carbon particles and their deformation yields a high apparent density in the active material layer—though with a porous filling mass. The high apparent density has the following advantages:

1. It contributes to an increased mechanical strength of the pressed layer. This particularly yields an increased tensile strength and improved adhesion of the active material layer with its electrical connector.
2. The carbon particles are electrically conductive. They contribute to the electrical conductivity of the active material layer, so that the addition of conductive carbon black can be dispensed with or the amount to be otherwise added can be reduced. Since during the pressing operation the carbon particles adapt their form to the form of the active material particles, one achieves particularly high electrical contacting.

Hence, the porous carbon particles have an advantageous effect on the properties of the active material layer in several respects. They improve the ion mobility, they increase the electrical conductivity, and they enhance the mechanical strength.

The total pore volume of the porous carbon particles is preferably within the range of 0.5 cm$^3$/g to 3.5 cm$^3$/g. The pore volume is here dominated by macropores, which manifests itself in an advantageous embodiment in that the porous carbon particles have pores in the size range of 50 nm to 5 μm, their share in the total pore volume of the porous carbon particles is at least 70%, particularly preferably at least 80%.

The porous carbon particles preferably have a hardness which ensures that they deform superficially during pressing in contact with the active material particles due to the locally acting pressure and break up into fragments. Hence, the porous carbon particles have a lower hardness than the active material particles and can thereby fill the gaps between the active material particles due to their deformation and can optimally contact them electrically.

The local compressive strength of the carbon particles is here of decisive importance.

The greater the share of the porosity of the carbon particles, which is due to the macropores, the more advantageous is this for the above-explained properties. In this respect the carbon particles show a porosity as high as possible which is preferably in the range of 70% to 90%.

Furthermore, it has turned out to be advantageous when at least a part of the porous carbon particles is graphitized.

For graphitization the carbon particles are heated to a high temperature (e.g. more than 2000° C.) for a long period of time (for instance several hours). In this process the structure converts into crystalline graphite, whereby previously existing micropores and most of the mesopores disappear. Only the macropores that are connected via channels do remain.

The high ion mobility permits faster charging and discharging processes or an increase of the active material layer. Preferably, the active material layer has a thickness of 75 μm or more.

This represents a comparatively great layer thickness after calendering.

As has been explained above, the use of porous carbon particles in the active material layer is particularly advantageously noticeable when the carbon particles are deformed by pressure and contact with the active material particles. In this respect an embodiment of the lithium ion cell according to the invention is particularly preferred in which the active material layer is pressed.

The active material layer is pressed in the simplest case by calendering.

To optimally unfold the above-explained advantageous effects of the porous carbon particles with respect to ion mobility, electrical conductivity and mechanical strength of the active material layer, a homogeneous distribution of carbon particles and active material particles is advantageous.

In this respect it has turned out to be useful when the active material particles have a mean diameter $\Phi A$ and the carbon particles have a mean diameter $\Phi K$, wherein the ratio $\Phi A/\Phi K$ is in the range of 0.25 to 4.

The proportion of the carbon particles in the active material layer is, for example, in the range of 2 vol. % to 40 vol. %. In comparison with an otherwise identical lithium ion cell and without the use of the porous carbon particles as diffusion additives, the lithium ion cell according to the invention shows an enhanced gravimetric and volumetric energy density.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
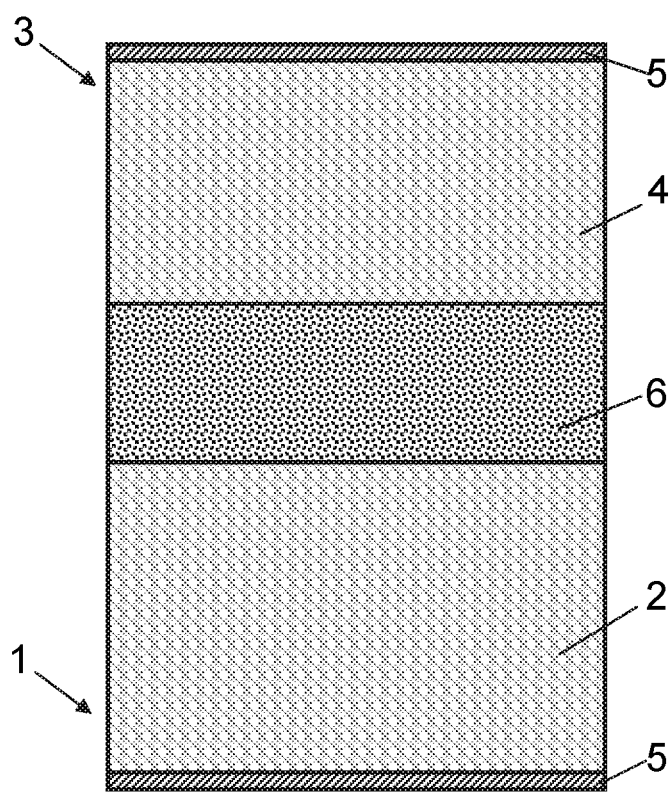
FIG. 1 is a schematic illustration showing a lithium ion cell having anode, cathode and separator.

FIG. 1 diagrammatically shows a battery cell of a lithium ion cell. In standard batteries, several battery cells of such a type can be connected electrically in series or in parallel.

In the simplest case, it consists of two interconnected half cells. The positive electrode 1 is called the cathode. The cathode contains an active material layer 2 having active material consisting of a lithium layered oxide, namely 1:1:1 nickel-manganese cobalt (NMC), which upon discharge of the cell is reduced. The active material layer 2 has a thickness of 70 μm.

The negative electrode 3 is called the anode. It contains an active material layer 4 which contains active material having lithium-intercalated graphite that is oxidized upon discharge of the cell. The active material layer 4 has a thickness of 50 µm.

Each of the electrodes 1, 3 includes a current collector 5, which typically consists of aluminum in the case of the cathode and of copper in the case of the anode.

A separator 6 is arranged between the two electrodes 1; 3 to separate the active material from the negative active material electrically and spatially.

The separator 6 consists of a stretched porous polymer film with a thickness of 25 µm.

The active material layers 2; 4 and the separator 6 are filled by an electrolyte. This electrolyte is a customary electrolyte for lithium ion cells, namely a 1:1 mixture of ethylene carbonate (EC) and dimethyl carbonate (DMC) with addition of vinyl carbonate.

The active material layers 2; 4 of both electrodes 1; 3 contain active material particles and porous carbon particles as well as fluorinated polymer as a binder.

Figure 2:
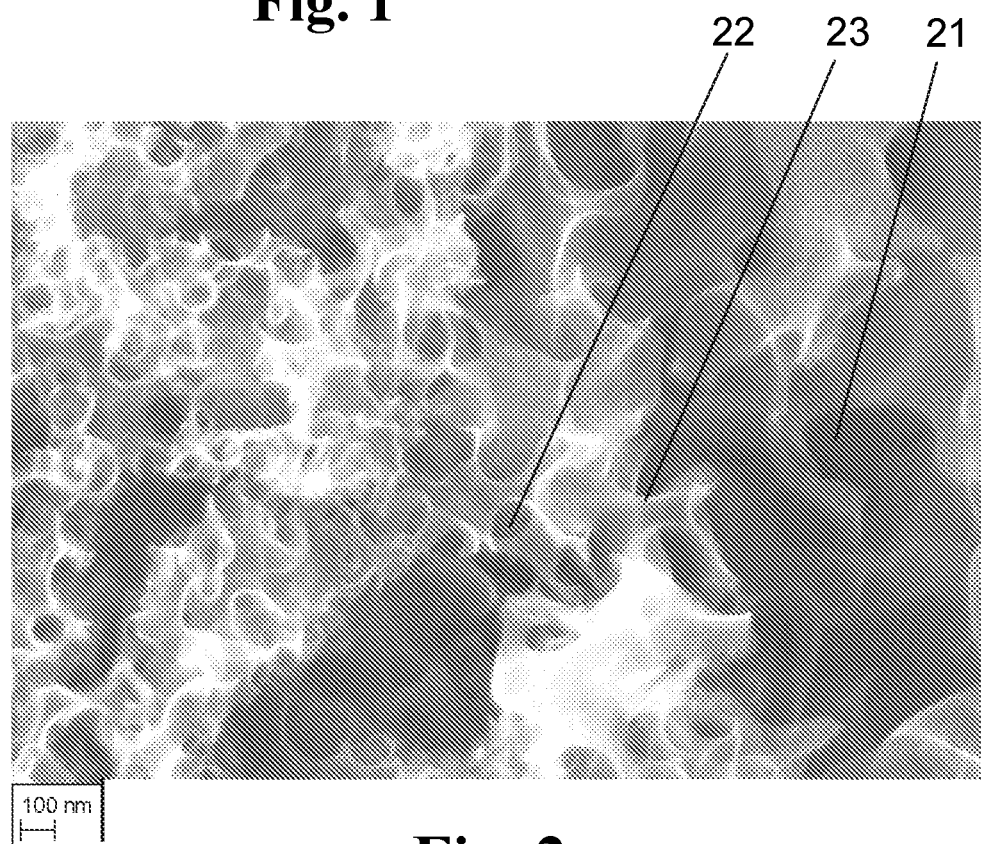
FIG. 2 is a scanning electron micrograph of a carbon particle according to an embodiment of the invention.

The carbon particles have a spherical morphology and a mean diameter of 25 µm. The SEM image of FIG. 2 shows such a carbon particle on a considerably enlarged scale. It is distinguished by an open porosity in which macropores 21 are interconnected via a three-dimensional network of channels 22. The size of the macropores 21 is in the range of 0.1 µm to 10 µm, and they are defined by filigree walls 23 with a small wall thickness of around 10 nm. The channels 22 have an opening width of around 1 µm. A little more than 80% of the volume of the carbon particles is formed by pore space. A measurement of the specific inner surface area according to the BET method yields measurement values of around 50 m$^2$/g. The low tortuosity of the carbon structure is plastically visible therefrom, i.e. the winding degree of the transport routes which is small in comparison with gas carbon blacks.

The pore system is brittle and gives in slightly to locally acting pressure, for instance in contact with other particles during calendering of the active material layer. This may also lead to shearing and fragmentation. The brittle deformed particles and fragments that are produced thereby have the same porosity as the original particles. They are distributed in the remaining vacant space of the active material layer, thereby more or less filling the space, depending on the amount of the carbon particles and the pressure applied.

Figure 3:
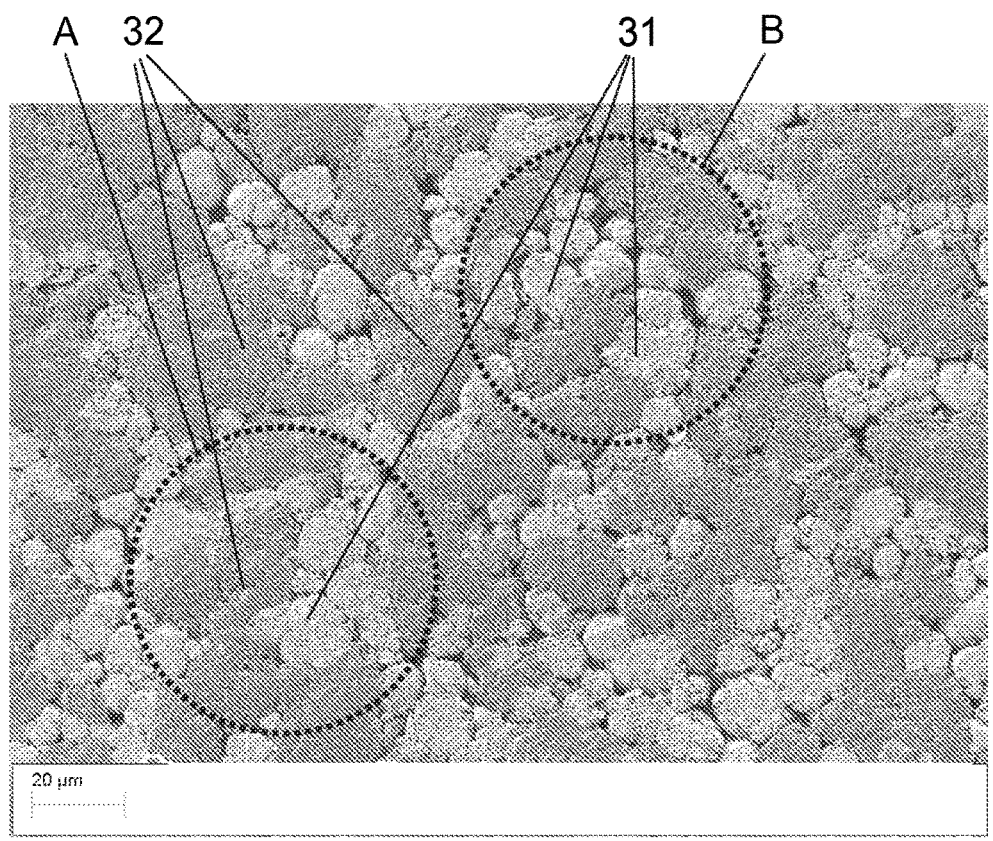
FIG. 3 is a scanning electron micrograph of an active material layer according to an embodiment of the invention after calendering in a top view section.

This is shown by way of example in the SEM image of FIG. 3 as a top view on an active material layer after calendering. The active material particles 31 are visible as light gray areas. They consist of the above-mentioned lithium layered oxides (1:1:1 nickel-manganese cobalt (NMC)) and have a mean particle size of about 15 µm with a substantially spherical morphology.

The carbon particles 32 are visible as dark gray areas. These particles are greater than the active-material particles, but show a rather irregular morphology. They nestle against the active material particles 31 and fill the vacant space between the particles more or less completely. In section A the filling operation is almost completed; in section B there are still gaps.

This structure is due to the brittle deformation of the carbon particles. During pressing of the active material layer the brittle carbon particles 32 suffer from superficial deformations or breaks and thereby nestle into the gaps existing between the harder particles. The porosity of the carbon particles and their fragments is not changed significantly; these particles are brittle. They prevent an entirely dense packing of the small active-material particles 31 with local increase in ion mobility within the active material layer. They also contribute to the mechanical strength of the layer and to the electrical conductivity. The three-dimensional network of the macropores leads to a particularly easy and fast penetration of the active material layer of the ions during charge transportation.

The effective diffusion coefficient $D_{eff}$ for particles in a porous material depends inter alia on the size of the pore space and on the pore distribution and can be described mathematically as follows:

$$D_{eff} = D_0 \times (\varepsilon \times \delta / \tau)$$

where:
  $D_0$ represents the specific diffusion coefficient for the electrolyte,
  $\varepsilon$ is the porosity (this value is less than 1),
  $\delta$ stands for the so-called constrictivity of the pore structure (this value is also less than 1), and
  $\tau$ designates the so-called tortuosity of the pore structure (this value is typically between 2 and 5).

The share of the effective diffusion coefficient which is due to porosity is described by the factor $(\varepsilon \times \delta / \tau)$. All parameters of the factor are normally influenced by the calendering of the active material layers 2; 4, namely towards compaction and thus reduction of $D_{eff}$. However, as has been described above, the porosity and the pore distribution do not change or change only insignificantly within the carbon particles used according to the invention. Their brittleness and the integrity of the three-dimensional network of the macropores—also in fragments—ensure a particularly easy and fast penetration of the active material layer 2; 4 by ions during charge transportation also upon filling up of the vacant spaces after compaction.

Table 1 shows a comparison of the parameters for porosity $\varepsilon$, tortuosity $\tau$, and constrictivity $\delta$ in the active material layer according to the invention and in a customary active-material layer and the diffusion coefficient $D_{eff}/D_0$ resulting therefrom according to the above formula.

TABLE 1

| Active material layer | Porosity $\varepsilon$, | Tortuosity $\tau$, | Constrictivity $\delta$ | $D_{eff}/D_0$ |
| --- | --- | --- | --- | --- |
| Standard mixture | 0.18 | 5 | 0.4 | 0.0144 |
| Invention | 0.8 | 2 | 1 | 0.4 |

The comparison shows that in the active material layer according to the invention one obtains a diffusion coefficient for the active material that is higher by the factor 27.8 due to the increased values for porosity, tortuosity and constrictivity.

Figure 4:
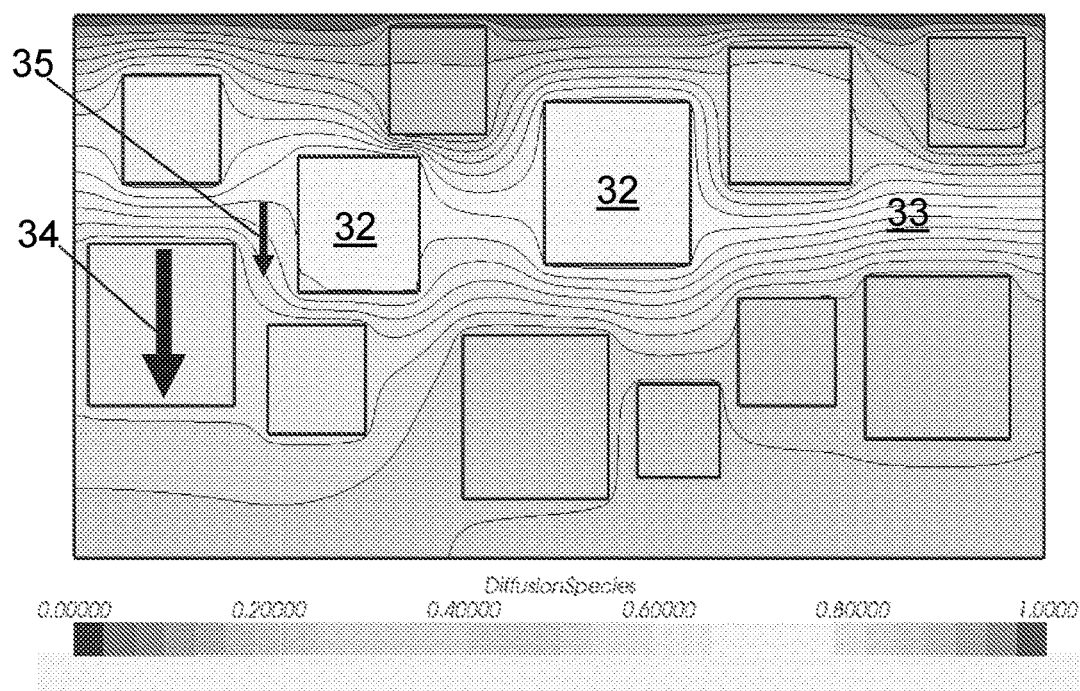
FIG. 4 is a diagram showing a result of a simulation calculation for diffusion in an active material layer containing macroporous carbon particles according to an embodiment of the invention.

This effect of the porous carbon particles 32 also follows from simulation calculations. FIG. 4 shows a diagram for explaining the local change in the diffusion rate by porous particles within the active material layer and their effect on the diffusion rate on the whole.

The porous carbon particles are designated by reference numeral 32; the remaining matrix of the active material layer by 33. The carbon particles 32 and the matrix 33 each have a constant diffusion rate for lithium ions. In the carbon particles 32, the diffusion rate is higher by the factor 10 than in the active material matrix 33, as illustrated by the different size of the directional arrows 34 and 35. The lines plotted in the diagram designate areas with the same diffusion progress. It can be seen that, as has to be expected, the diffusion is faster within the carbon particles 32 than in the matrix, but that the diffusion rate 35 in the matrix 33 is also enhanced by the carbon particles 32, so that a faster diffusion progress follows on the whole due to the active material layer.

Therefore, this property of the carbon particles 32 achieves an altogether higher ion mobility within the active material layer, i.e. a faster charging and discharging operation. Therefore, with the same electrochemical performance the active material layer can be given a greater thickness in the lithium ion cell of the invention than is customary, e.g. a thickness of 100 μm or more. This simplifies cell production and reduces the manufacturing costs.

Figure 5:
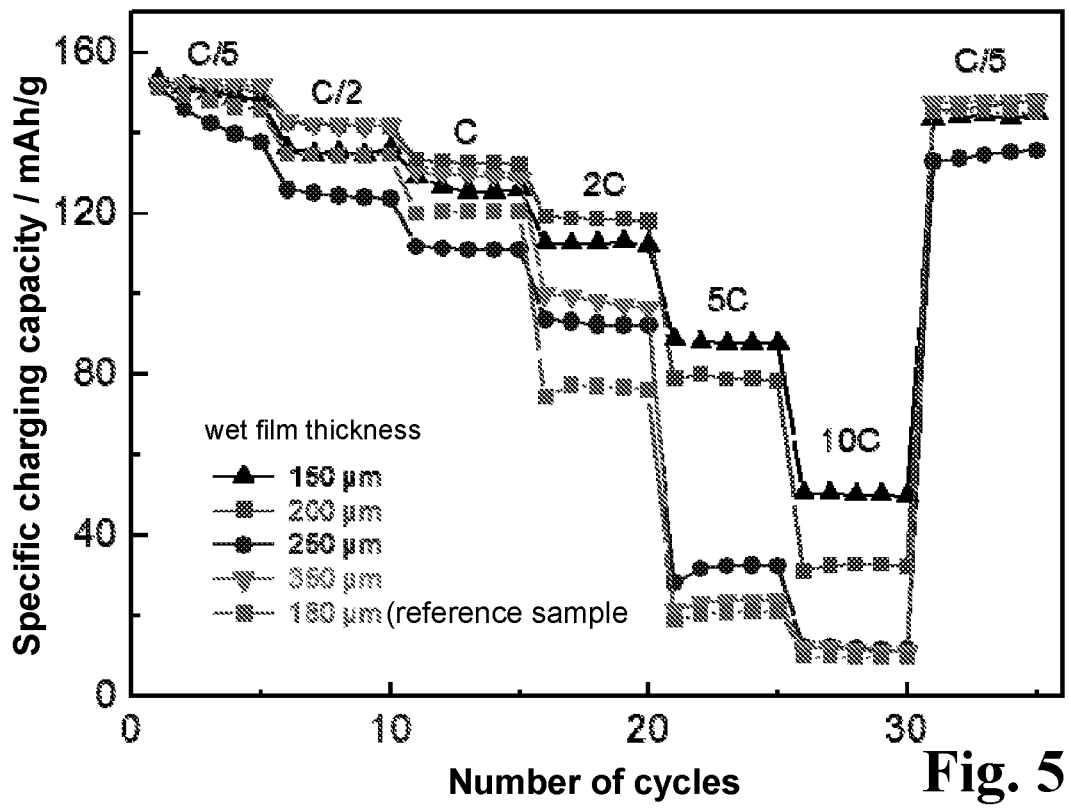
FIG. 5 is a graphical representation showing C-charging curves of lithium ion cells having different thicknesses of the active material layer according to embodiments of the invention, as compared with the charging curve of a standard cell.

This is also emphasized by the C-charging curves of FIG. 5. The specific charging capacity of a cell is plotted in mAh/g on the y-axis against the number of the charging cycles. The curves show measurement results for five different cells, of which one is a standard cell, in which the active material layer does not contain any carbon particles, and the four other ones differ in the thickness of the respective active material layer. The legend indicates the wet film thickness as measured after application of the respective layers with a doctor blade. The measurements, however, were taken on calendered layers. During calendering the wet film thickness decreases approximately by the factor 3. For instance, the layer which has a thickness of 350 μm after doctor blade application has a dry layer thickness of 100 μm after calendering.

The charge rate was increased every five measurement cycles. The charge rate is indicated in the unit "C", where "1C" stands for a charge rate at which the cell is completely charged within one hour. At a charge rate of "2C" the cell is completely charged within 0.5 hr, etc. The maximal discharging capacity of all battery cells is about 160 mA/g. At a low charging rate of C/5 this value is reached by all cells. The measurement result, however, shows that also at high charge rates of "2C" and higher the cells according to embodiments of the invention with a share of carbon particles in the active material layer still reach a discharging capacity that is much higher in comparison with the standard cell. This is particularly true for the cells with a wet film thickness of 150 μm and 200 μm. With thicker layers and at a very high charge rate of 5C and 10C the greater layer thickness limits the discharging capacity achieved. For verifying the proper state of the cells the initial low charge rate of "C/5" was again used for completing the measurement with the cycles 30 to 35. It has been found that all cells approximately reach the original values of the maximal discharging capacity again, except for the cell with a doctor-blade layer thickness of 250 μm, the measurement results of which may be regarded as not being representative due to a stability problem.

The manufacturing method for the porous carbon particles for use in an active material layer is described in German published patent application DE 10 2010 005 954 A1, the content of which is incorporated herein by reference.

In a first step a porous metal oxide template of agglomerated or aggregated metal oxide nanoparticles is first produced by hydrolysis or pyrolysis of a starting compound by means of a soot deposition process. The pores are infiltrated with a carbon precursor substance. After carbonization the template is again removed by etching. What remains is a porous carbon product having a hierarchical pore structure with platelet-like or flake-like morphology. The material is known under the trademark Porocarb™ of Heraeus Quarzglas GmbH & Co. KG.

Figure 6:
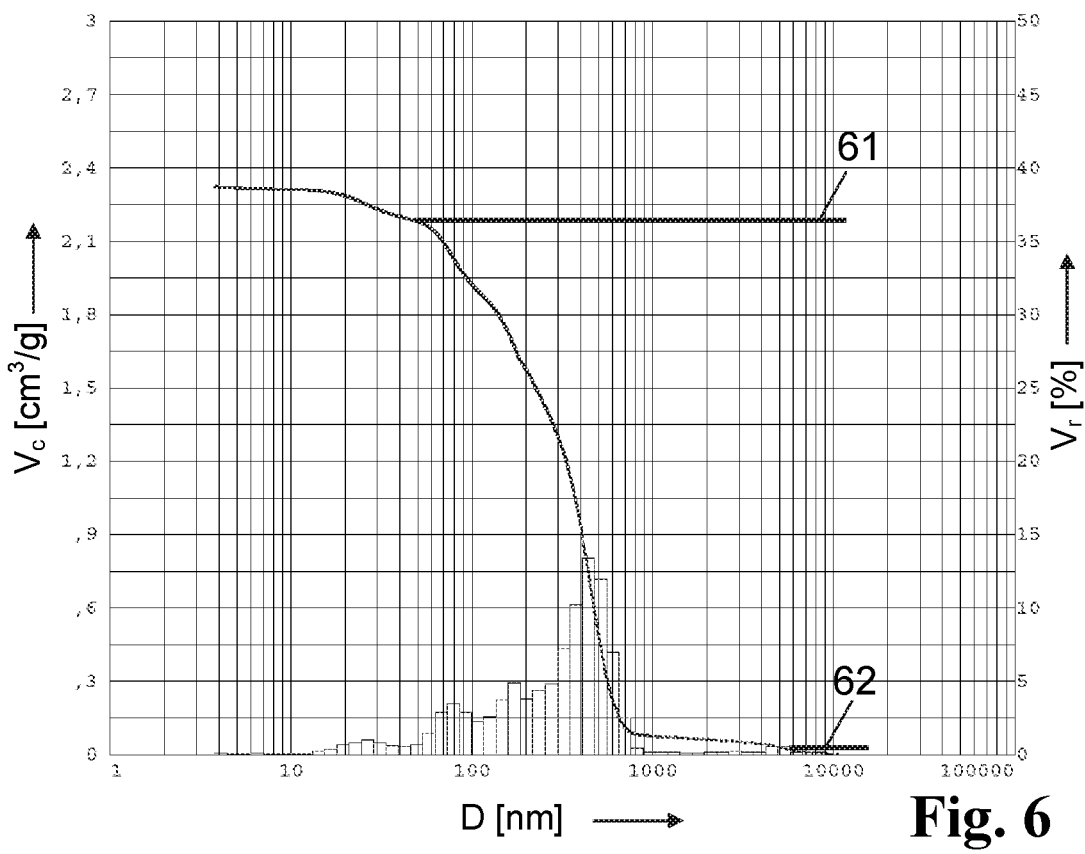
FIG. 6 is a graphical diagram for the pore size distribution of the porous carbon particles according to an embodiment of the invention.

The diagram of FIG. 6 shows the pore size distribution in a graphitized sample. The porous carbon particles are here heated to a temperature of more than 2000° C. and kept at this temperature for several hours until the carbon has been converted into graphite. All micropores and most of the mesopores disappear in this process. This represents an embodiment of the porous carbon particles that is optimized within the meaning of the invention.

On the left ordinate, the cumulative pore volume $V_c$ is plotted in [cm$^3$/g] and on the right ordinate the relative pore volume $V_r$ in [%] against the pore diameter D in [nm]. It is visible that the maximum of the pore size distribution is around 400 nm, and that pores with pore sizes above 50 nm (line 62) and pores with a pore size of less than 5000 nm (line 61) represent about 91% (2.1/2.3 cm$^3$/g) of the total pore volume.

The porous carbon particles are comminuted to a mean particle size of around 25 μm and are used together with other components for producing the active material layers of the electrodes of a rechargeable lithium battery with the following formulation.

| | | |
|---|---|---|
| Cathode active material: | NMC111 (LiNiCoMnO2) | 90% wt. % |
| Porous carbon particles: | Porocarb ™ LD2N | 3% wt. % |
| Conductive additive: | Timcal Super P Li | 3% wt. % |
| Binder: | PVDF (as 5% solution in NMP) | 4% wt. %. |

These components are homogenized in a slurry and applied by way of a doctor blade in the standard manner as a layer on a metallic foil. The composite of metal foil and layer is subsequently consolidated by drying and calendering.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A lithium ion cell for a secondary battery, the cell having an electrode comprising a pressed active material layer containing active material particles and a particulate porous additive in contact with a non-aqueous electrolyte, wherein the additive comprises porous carbon particles having a porosity in a range between 50% and 95% and comprising fluidically interconnected macropores defined by carbon walls having a mean wall thickness in a range of 5 nm to 500 nm, wherein a proportion of the additive in the active material layer is in a range of 2 vol % to 40 vol %, and wherein the porous carbon particles exhibit brittle deformation.

2. The lithium ion cell according to claim 1, wherein the porosity of the porous carbon particles is in a range of 70% to 90%.

3. The lithium ion cell according to claim 1, wherein the carbon walls have a mean wall thickness in a range of 10 nm to 100 nm.

4. The lithium ion cell according to claim 1, wherein the porous carbon particles have a total pore volume in a range of 0.5 to 3.5 cm$^3$/g.

5. The lithium ion cell according to claim 1, wherein the porous carbon particles have pores in a size range of 50 nm to 5 μm, a proportion of which in a total pore volume of the porous carbon particles is at least 70%.

6. The lithium ion cell according to claim 5, wherein the proportion is at least 80%.

7. The lithium ion cell according to claim 1, wherein at least a part of the porous carbon particles is graphitized.

8. The lithium ion cell according to claim 1, wherein the active material layer has a thickness of at least 75 µm.

9. The lithium ion cell according to claim 1, wherein the active material particles have a mean diameter $\Phi A$, the carbon particles have a mean diameter $\Phi K$, and a ratio $\Phi A/\Phi K$ is in a range of 0.25 to 4.

* * * * *